United States Patent [19]

Monen

[11] Patent Number: 4,464,757

[45] Date of Patent: Aug. 7, 1984

[54] METHOD AND DEVICE FOR WRITING AND READING SECTOR-ORGANIZED INFORMATION INTO AND FROM A RECORD CARRIER BODY

[75] Inventor: Marinus J. B. M. Monen, Eindhoven, Netherlands

[73] Assignee: U.S. Philips Corporation, New York, N.Y.

[21] Appl. No.: 289,666

[22] Filed: Aug. 3, 1981

[30] Foreign Application Priority Data

Aug. 14, 1980 [NL] Netherlands ................. 8004598

[51] Int. Cl.³ .................................. G06F 11/14
[52] U.S. Cl. .................................. 371/71; 371/38
[58] Field of Search ............... 371/8, 11, 13, 38, 40, 371/71, 72

[56] References Cited

U.S. PATENT DOCUMENTS

| | | | |
|---|---|---|---|
| 3,648,238 | 3/1972 | Yarrington | 371/40 |
| 3,701,094 | 10/1972 | Howell | 371/40 |
| 3,751,649 | 8/1973 | Hart, Jr. | 371/71 |
| 3,794,818 | 2/1974 | Kennedy | 371/71 |
| 3,940,601 | 2/1976 | Henry et al. | 371/71 |
| 4,059,748 | 11/1977 | Violino | 371/13 |
| 4,211,997 | 7/1980 | Rudnick et al. | 371/40 |
| 4,225,873 | 9/1980 | Winslow | 346/76 |
| 4,251,863 | 2/1981 | Rothenberger | 371/38 |
| 4,292,684 | 9/1981 | Kelly et al. | 371/40 |
| 4,308,557 | 12/1981 | Dieterich | 371/40 |
| 4,363,116 | 12/1982 | Kleuters et al. | 369/30 |
| 4,363,125 | 12/1982 | Brewer et al. | 371/38 |

OTHER PUBLICATIONS

IBM Technical Disclosure Bulletin, vol. 18, No. 5, Oct. 1975 "Tape Defect Bypass Mechanism" N. K. Ouchi.
IEEE Transactions on Sonics and Ultrasonics, vol. Su-17, No. 1 Jan. 1970, Wide-Band Acoustooptic Deflectors using Acoustic Beam Steering, Gerald A. Coquin et al.

Primary Examiner—Jerry Smith
Assistant Examiner—Gary V. Harkcom
Attorney, Agent, or Firm—Jack E. Haken; James J. Cannon, Jr.

[57] ABSTRACT

Information is written in consecutively arranged sectors of a record carrier body, preferably an optical disc. The information is written interleaved into the record carrier body. The information is read directly after writing for the purpose of verification. An identifier, indicating a previously correctly inscribed sector is added to the information to be written in a sector. The added identifier enables the transfer of only the correctly written information during a read operation.

7 Claims, 11 Drawing Figures

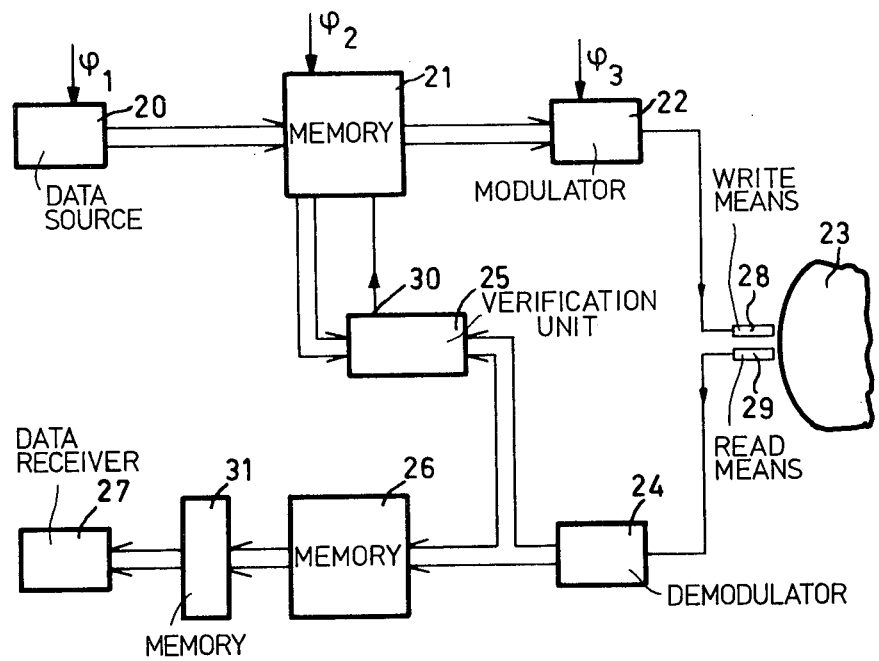
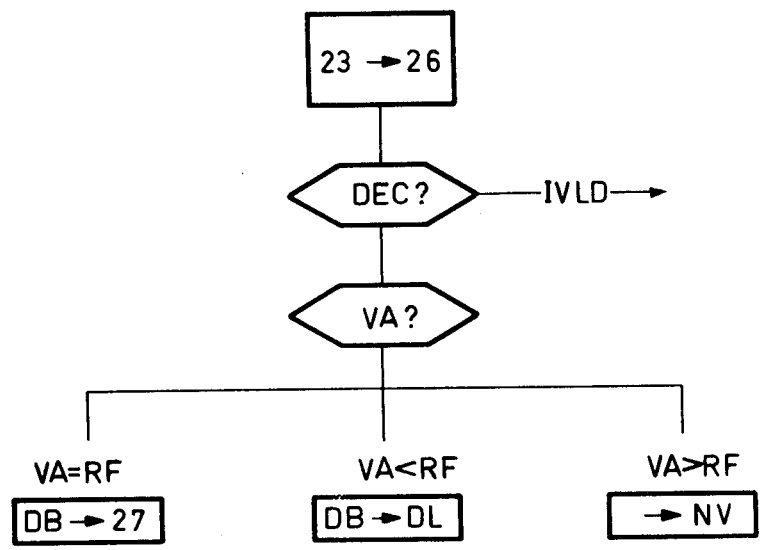

| | | | | | | | | | | |
|---|---|---|---|---|---|---|---|---|---|---|
| 1 | 42 | 83 | 124 | 165 | | 493 | 534 | | 575 | 616 |
| 2 | 43 | 84 | | | | 494 | 535 | | 576 | 617 |
| 3 | 44 | | | | | | | | | |
| 4 | 45 | | | | | | | | | |
| | | | | A | | | | C | | |
| 31 | 72 | | | | 482 | 523 | | | | |
| 32 | 73 | | | | 483 | 524 | | | | |
| 33 | 74 | | | | 484 | 525 | | | | |
| 34 | 75 | | | | 485 | 526 | | | | |
| | | | | | | B | | | | 654 |
| 40 | 81 | 122 | | | 491 | 532 | 573 | | 614 | 655 |
| 41 | 82 | 123 | | D | 492 | 533 | 574 | E | 615 | 656 |

FIG. 3d

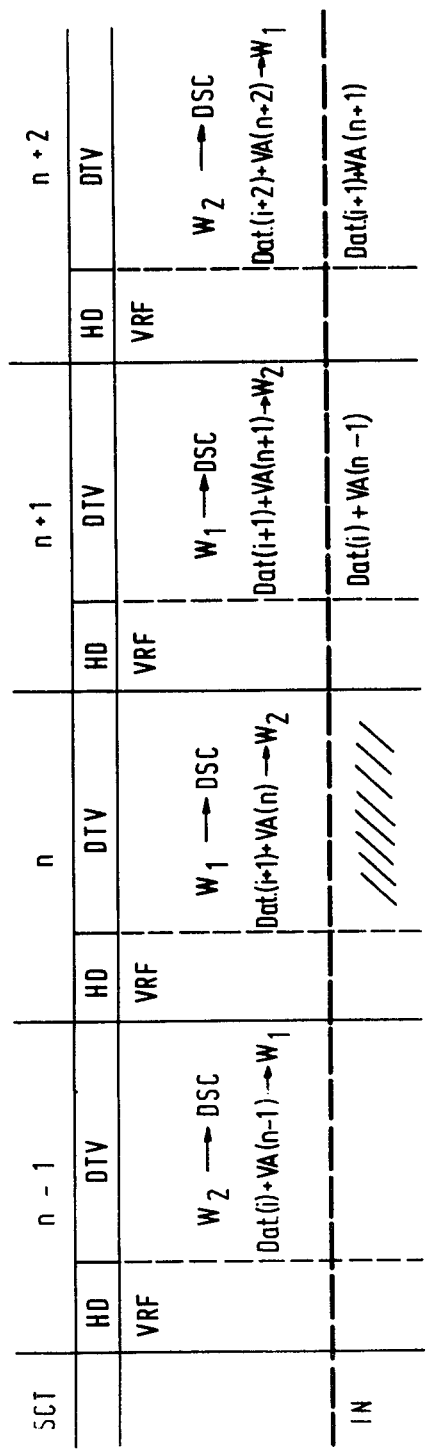
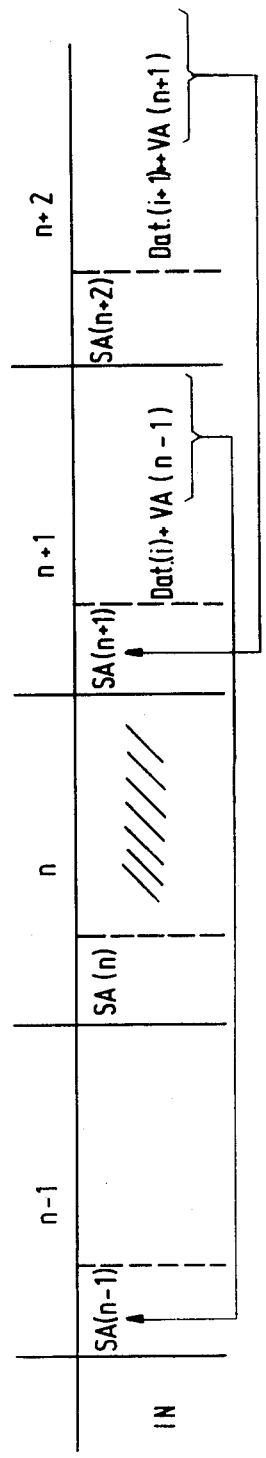
FIG.5a
FIG.5b

| SCT N° | 0 | 1 | 2 | 3 | 4 | 5 | 6 | 7 | 8 | 9 | 10 |
|---|---|---|---|---|---|---|---|---|---|---|---|
| IN | Dat(0)+BG | ///// | Dat(1)+VA(0) | Dat(2)+VA(2) | Dat(3)+VA(3) | Dat(f)+VA(4) | ///// | Dat(4)+VA(4) | Dat(5)+VA(7) | Dat(6)+VA(8) | Dat(7)+VA(9) |
| OSC → | $R_1$ | $R_2$ | $R_1$ | $R_2$ | $R_1$ | $R_2$ | $R_1$ | $R_2$ | $R_1$ | $R_2$ | $R_1$ |
| DEC? | | | VLD | IVLD | VLD | VLD | VLD | VLD | IVLD | VLD | VLD |
| VA ↔ SA | | | INF | | VA(0)=SA(0) | VA(2)=SA(2) | VA(3)=SA(3) | VA(4)=SA(4) | | VA(4)<SA(5) | VA(7)=SA(7) |
| $R_4$ ↑ | | | | | 100 | 100 | 100 | 100 | | DL | 100 |
| $R_3$ ↑ | | | $R_4$ | | $R_4$ | $R_4$ | $R_4$ | $R_4$ | | $R_4$ | $R_4$ |
| ↑ $R_3$ | | $R_1$ | $R_2$ | $R_1$ | $R_2$ | $R_1$ | $R_2$ | $R_1$ | $R_2$ | $R_1$ | $R_2$ |
| OUT 100 | | | | | Dat(0) | Dat(1) | Dat(2) | Dat(3) | | | Dat(4) |

FIG.7

METHOD AND DEVICE FOR WRITING AND READING SECTOR-ORGANIZED INFORMATION INTO AND FROM A RECORD CARRIER BODY

BACKGROUND OF THE INVENTION

1. Field of the Invention

The invention relates to a method of writing information in a bit-serial sequence into consecutively arranged sectors of a record carrier body, the information written being read directly after writing for the purpose of verification and being rewritten into a subsequent sector if the information has been incorrectly written; in each sector to be inscribed there being written an identifier adjacent the information. The invention also relates to a method of reading information written in accordance with the above method. Finally, the invention relates to a device for performing the above methods.

2. Description of the Prior Art

A method of this kind is known from the article "Tape defect bypass mechanism" by N. K. Ouchi, published in IBM Technical Disclosure Bulletin, Vol. 18, No. 5, page 1577, October 1975. This article describes a method where the information originating from a data stream is written on a magnetic tape in the form of data blocks. If the verification directly after the write operation reveals that the data block has been incorrectly written, the same data block is written again in the subsequent sector. To this end, the data block to be written is stored in a buffer during writing. A sequence identifier is appended to each block to be written. This identifier does not form part of the information written by a user and indicates the logic sequence of the data blocks written. The identifier provides as if it were a sequence number for successive data blocks formed from the data stream. If a data block is written again in a subsequent sector as a consequence of the verification, the rewritten data block has the same identifier as the original data block. It is only when a next data block is fetched from the data stream that a next identifier is assigned thereto. Because the sequence of the data blocks is known, any rewritten data blocks can be recognized when the information written is read. If two or more successive data blocks have the same identifier, the data blocks have evidently been rewritten.

However, it is a drawback of such a method that correctly written data blocks are not unambiguously indicated by the identifier. When the data blocks are read, the best one of the set of data blocks having the same identifier is then selected. Furthermore, a problem is encountered if not all identifiers assigned per record carrier body are unique. If they are not unique, loss of data is still feasible. Moreover, very accurate record-keeping of the identifiers thus selected is required if the record carrier body has not been completely inscribed.

SUMMARY OF THE INVENTION

It is an object of the invention to provide a method of writing information in successive sectors with unambiguous indication of correctly written data blocks.

To this end, a method in accordance with the invention is characterized in that after the verification of an inscribed sector, the identifier for a next sector is formed on the basis of the verification, said identifier indicating the address of a previously correctly inscribed sector correctly inscribed and being written each time adjacent the information of a next sector until said next sector has been verified as being correct. Because the identifier is formed for each sector and indicates the address of a previously correctly inscribed sector, a chain of correctly inscribed sectors is obtained.

A preferred embodiment of the method in accordance with the invention is characterized in that said identifier indicates the most recent sector for which it has been verified that the information inscribed therein has been correctly written. A small buffer capacity then suffices.

Preferably, the data block is written into a buffer in a first sequence of first data segments, a number of correction bits being added to each first data segment, the data block subsequently being written on the record carrier body in a second sequence of second data segments, the second data segments being formed by division of each of the first data segments ("interleaving") into as many subsegments as there are second data segments, all $n^{th}$ data subsegments of all first data segements forming the $n^{th}$ second data segment. Due to the addition of error correction bits to each of the first data segments, errors at the level of a small number of bits within such a data segment can be corrected. However, such an error correction code does not yet provide a solution for the correction of an error burst spread across a larger number of bits. The effect of such an error burst is substantially reduced by said division (also referred to as "interleaving"). The effect of such an error burst in a first data segment is then distributed over the second data segments, so that such an error burst is reduced to an error at the level of a data subsegment. An error at the level of a short data subsegment can be corrected by means of the error correction code.

Sectors inscribed by means of the method in accordance with the invention are preferably read so that only the information from sectors which are indicated at least once by said identifier is transferred to a receiver, while the information read from the other sectors is deactivated. Because the correctly written sectors are unambiguously indicated by their identifier, only correct information is presented to the user during the read operation. Furthermore, should the record carrier body be locally damaged during its service life, the attention of the user can be drawn thereto. This is because the chain of correct information is then usually interrupted, so that the attention of the user will drawn to this missing link in the chain.

For executing the method of writing information, use is made of a device comprising a memory with at least two memory units for the temporary storage of the information to be written, an input of said memory units being connected to receive external information, an output being connected to a write device, each memory unit having a capacity for the storage of information for at least one sector. Preferably, there are provided means for activating at substantially the same instant either an input of one memory unit and an output of the other memory unit, or an output of said one memory unit and an input of said other memory unit. The storage of information in the one memory unit while the content of the other memory unit is being written enables fast processing.

For the reading of the information, use is made of a device comprising a memory for the temporary storage of the information read from a sector, an input of said memory being connected to a read device and an output of the memory being connected to a further memory. Preferably, the further memory comprises at least two memory units, each memory unit having a capacity for the storage of information originating from at least one sector, said further memory having an output which is connected to a data receiver, means being provided which are controlled by the identifier either to supply the information stored in the memory unit to the data receiver or to deactivate this information. Correctly written information can thus be quickly located and output.

Because the exact meaning of the terms "sector", "vector address" and "data block" is not unambiguously defined in literature, the meaning of these terms as used herein is defined below.

Sector:

the record carrier body comprises at least one track. A track comprises at least one sector. A sector contains space for the writing of information. This space is divided into a synchronization area (HD) and a data field (DTV). Each sector contains a number of bytes. The number of bytes per sector is not necessarily the same for each sector.

The synchronization area (HD) contains organization information, for example, the track number, the sector address and synchronization signals. This organization information is customarily provided during the manufacture of the record carrier body. In the data field (DTV) there is space for information, for example, data information which can be provided by the user.

Vector address:

a vector address is an indication information (identifier) which indicates a preceding, already written sector of the record carrier body, the information in said preceding sector having been verified as having been correctly written by the verification directly after the write operation. Conversely, the fact that a sector is indicated by a vector address confirms that the information in said indicated sector has been correctly written.

Data block:

a data block contains a number of bytes. The user can write a data block in each sector. A data block contains, for example, the data information to be written, together with the associated vector address and the error correction bits. When the organization information has already been provided in the synchronization area of a sector during the manufacture of the record carrier body, a data block represents the content written into the data field of the sector.

BRIEF DESCRIPTION OF THE DRAWINGS

The invention will be described in detail hereinafter with reference to the accompanying diagrammatic drawings.

FIG. 1 shows a device for writing and reading information onto and from a record carrier body, FIG. 2 shows a flow chart of an examination procedure for a sector read, FIG. 3d shows an example of a format of a data field for an optical disc;

FIG. 5a shows an example of how a number of successive sectors of a track of the optical disc are inscribed, FIG. 5b illustrates the statement "a vector address indicates a previous, correctly inscribed sector", FIG. 6 shows a flow chart of a read procedure for the reading of a sector as used in the preferred embodiment and FIG. 7 illustrates a read procedure.

DESCRIPTION OF THE PREFERRED EMBODIMENT

Figure 3A:
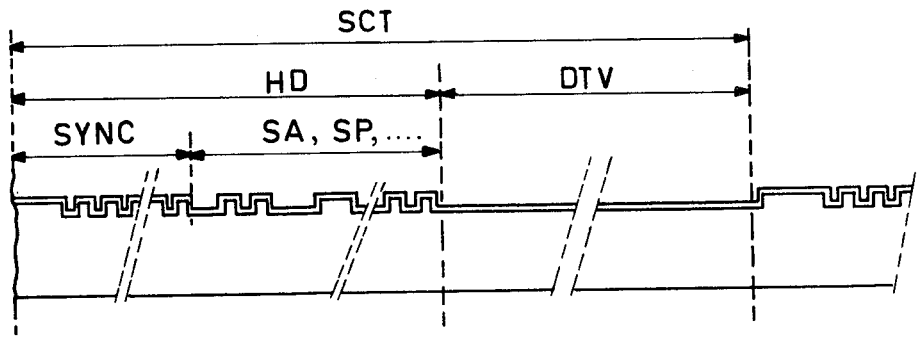
FIG. 3a shows an example of the lay-out of a sector of a track.

FIG. 1 shows a device for writing information in a record carrier body, and for reading this information. The clock signals $\phi_1$, $\phi_2$, $\phi_3$ originate from a clock (not shown). The information to be written originates from a data source (20). Under the control of a first clock signal $\phi_1$, information is fetched, for example, 8 bits in parallel, from the data source and is stored in a memory (21) under the control of a second clock signal $\phi_2$. Under the control of the second clock signal $\phi_2$, a sufficient amount of information is fetched and stored in the memory (21) for the filling of one sector with one data block. To this information, being stored in the memory, a vector address is added so that a data block is formed in the memory. Under the control of a third clock signal $\phi_3$, the data block is transferred, via a modulator (22) which converts the parallel information stream into a serial stream, to a write means (28) which writes the data block in a sector of the record carrier body. During the write-operation, the data block is maintained in the memory (21). During the writing, a read means (29) reads the data block directly after it has been written on the record carrier body. Directly is to be understood to mean herein that the period of time expiring between the writing of the information and the reading of the same information by the read means (29) is smaller than the period of time required by said read means for reading the synchronization area of a sector. The bit-wise read signal is applied, via a demodulator (24) which converts the serial bit stream into a parallel stream, to a verification unit (25). Because the data block is read directly after the writing, the recently written data block can be compared during the write phase with the original data block stored in the memory (22). This comparison is performed in a verification unit (25). The result of this comparison, the verification result, appears on an output terminal (30) of the verification unit (25). If the data block read by the read means corresponds to the original data block stored in the memory (21), it is considered to be a correctly written data block. If the data block has been correctly written, a next data block may be stored in the memory. This next data block is then written in the described manner in the next sector. If the data block has not been correctly written, the data block is written again in the next sector before a next data block is stored in the memory (21).

When the information is retrieved from the sectors inscribed on the record carrier body, the signal from the read means (29) is applied to a memory (26) via said demodulator (24). The sectors are successively read. A test procedure is used to determine whether the data block is a correctly or an incorrectly written data block. This test procedure will be described hereinafter. If it is a correctly written data block, it is applied to a data receiver (27); if not, the data block is deactivated. The element 31 is a memory whose function will be described later.

FIG. 2 shows a flow chart of a test procedure for a sector read. A data block read from the record carrier body (23 of FIG. 1) is stored in the memory (26) (memory 26 of FIG. 1) (23→26). Subsequently, it is tested (DEC?=decode) whether the most recently read data block is a valid data block. It is tested, for example, whether the data block is permitted according to the code restriction. In the case of a valid data block, the vector address may be examined (VA?). If the data block is not valid, it is deactivated (IVLD=invalid). The test for the vector address implies that the vector address from the data block of the sector read will be decisive as to whether or not a data block from a previously read sector is indicated as being correctly or incorrectly written. This data block from said previously read sector is stored in a memory (memory 31 of FIG. 1). The vector address is tested by comparing the vector address of the data block from the sector read with a reference information (RF) associated with said previously read sector. Such a reference information is, for example, the sector address of said previously read sector.

The test of the vector address may have three different results:

1. VA=RF

The vector address corresponds to the reference information (RF). The vector address of the data block read then indicates said previously read sector. The previously read sector, therefore, contains a correctly written data block. Consequently, the data block (DB) from the previously read sector is applied to a data receiver (27) (data receiver 27 of FIG. 1). (DB→27). The data block read is then transferred to the memory 31 and will act as previously read sector for a sector to be read later.

2. VA<RF

The vector address does not correspond to the reference information and indicates a sector read before the previously read sector. In that case the previously read sector does not contain a correctly written data block, because this sector is not indicated. Consequently, the data block from said previously read sector is deactivated (DB→DL) (DL=delete). The data block from the sector read is transferred to the memory (31).

3. VA>RF

The vector address does not correspond to the reference information and indicates a sector which follows the previously read sector. This result contradicts the defined property of a vector address. In this case the user receives a signal (NV) (NV=not valid).

PREFERRED EMBODIMENT

In the preferred embodiment a radiation-sensitive medium, referred to as an optical disc, is used as the record carrier body. Such a type of optical disc is described in U.S. Pat. No. 4,363,116. The optical disc comprises a servo track, one revolution being referred to as a track and each track being subdivided into a number of sectors.

FIG. 3a is analogous to FIG. 3 of U.S. Pat. No. 4,363,116 and shows an example of the lay-out of a sector (SCT) of a track. Such a sector is subdivided into a synchronization area (HD) and a data field (DTV).

Figure 3C:
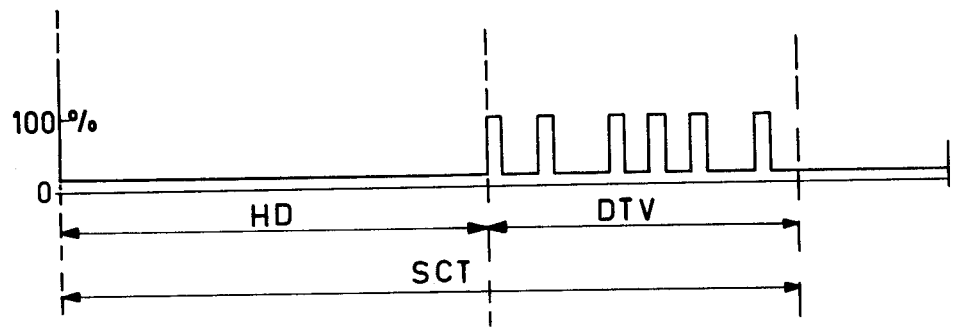
FIG. 3c shows an example of the intensity variation of the WRS beam in a sector.
Figure 3B:
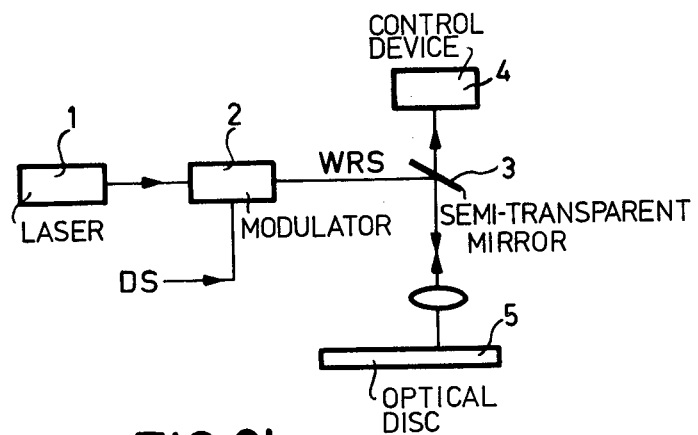
FIG. 3b shows a device for writing data information and for reading organization information from an optical disc.

The synchronization area (HD) is intended for organization information inscribed during the manufacturing of the optical disc. The organization information contains inter alia the track number (SP), the sector address (SA) and also word and bit synchronization (Sync). The data field (DTV) is intended for the writing of the data block. A laser is used as the write means for writing data blocks in the optical disc. FIG. 3b shows a device for writing data in the optical disc and for reading the organization information from such an optical disc. The beam of a laser (1) is incident on an acousto-optic modulator (2) which is controlled by the data signal (DS). The modulated laser beam (WRS beam) passes via a semi-transparent mirror (3) to the optical disc (5). The reflected beam (WRS beam) is directed to a control device (4) via the semi-transparent mirror. FIG. 3c shows an example of the intensity variation of the WRS beam in a sector. The intensity is low when the beam is in the synchronization area (HD) of the sector. Because no data is written in the synchronization area, the beam serves as a read beam for the organization information which it transfers to the control device (4). The intensity of the WRS beam in the data field is determined by the modulated data signal.

The data blocks are written in the optical disc by the WRS beam and are read directly thereafter. This requires a read means which reads the data written directly after the writing. For this read means use is made of a second laser beam (DRS). This beam can be formed by using a second laser as described in U.S. Pat. No. 4,225,873 or by optical splitting of the laser beam used for the WRS beam.

The information received from a data source is written in the form of data blocks in the sectors of the optical disc. FIG. 3d shows an example of how such a data block is composed. Each of the numerals 1 to 656 in the Figure represents a tetrade or group of four bits (i.e. one half of an eight-bit byte). The section A contains information supplied by a user, the supply sequence being: one line after the other, i.e. from left to right; the tetrades in the section B do not count in this respect: 1, 42, 83, . . . , 493, 2, 43, . . . , 3, 44, . . . , 4, . . . , 483, 524, 33, . . . , 484, 34, . . . , 485, . . . , 40, 491. This data block thus contains 512 tetrades (256 bytes). For the storage on the record carrier body, 656 tetrade positions are available as described; the content thereof will be described hereinafter. The 656 tetrade positions are present on the record carrier body in the numerical sequence: 1, 2, 3, . . . , 40, 41, 42, 43, . . . , 656 (interleaved). The further sections are used as follows:

(1) the section containing the tetrades 525 . . . 532 (4 bytes) is available for characterizing the information of the relevant sector. This characterization can indicate that the relevant sector is the first one of a group of sectors which together form a member of a file. In many cases such a first sector will contain a title of the relevant member. The characterization may also indicate that the relevant sector is the first one or the last one of a given user file, which thus contains information of a similar kind or is accessible only for a given category of users.

(2) the section D at the bottom left which contains the tetrades 41, 82, . . . , 533 (13 tetrades) is intended for the vector address. The information thus to be provided (sections A, B, D) contains 41 lines of 13 tetrades (52 bits) each.

(3) for each line the sections C, F contain three tetrades (12 bits) of error correction bits. These three tetrades enable correction of one arbitrarily disturbed tetrade per line (64 bits).

Using a suitable corrector matrix, the following error indication can be found when such a line is read:

(a) correct/incorrect information (1 bit),
(b) an error locator which indicates in which position the error is present,
(c) an error value which is a value which has to be added modulo-2 to the disturbed tetrade in order to reconstruct the non-disturbed tetrade.

Such an error correction system is known per se. By interleaving in accordance with FIG. 3d, one series of 42 consecutive, arbitrarily disturbed tetrades can thus be corrected per data block.

Figure 4:
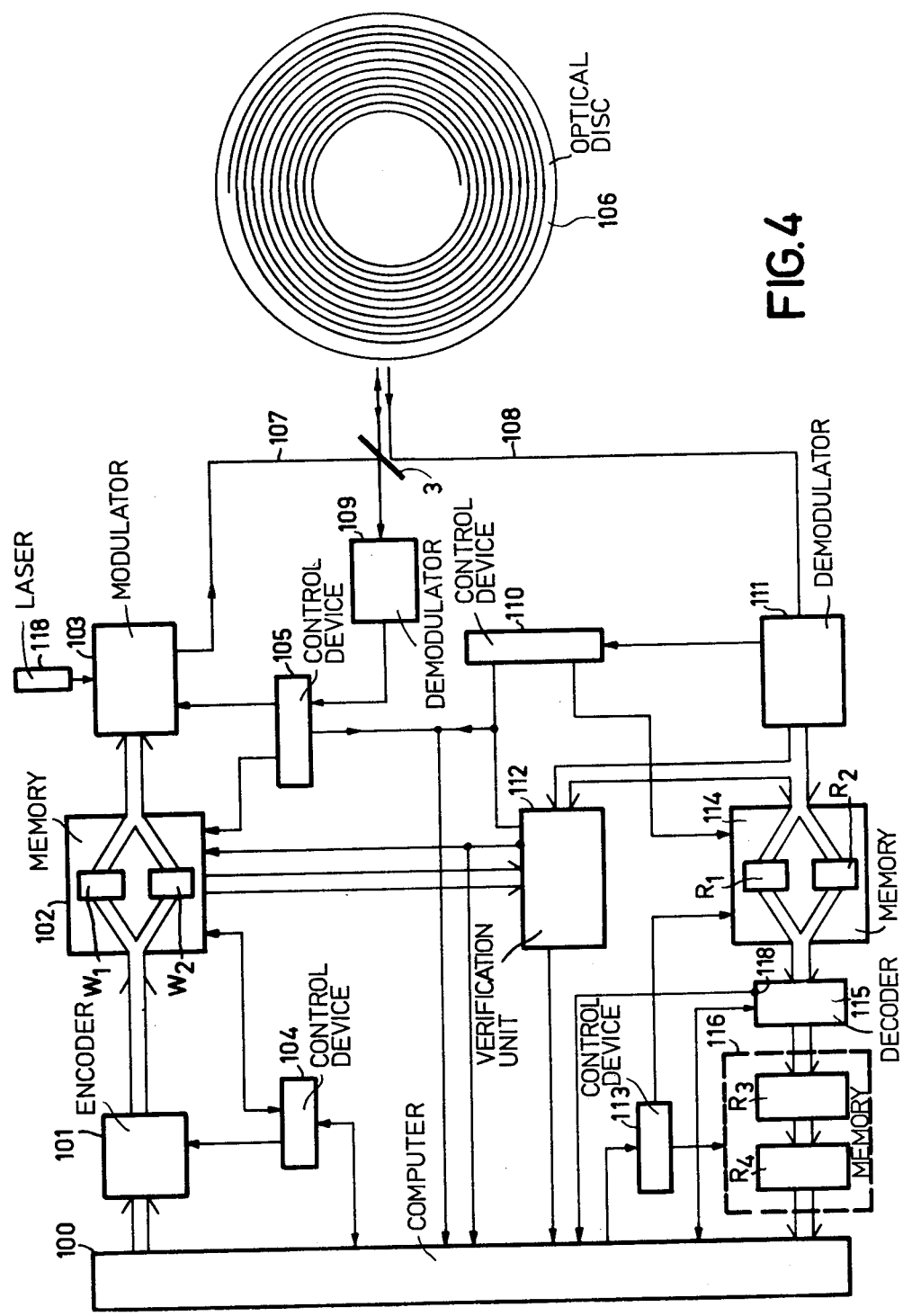
FIG. 4 shows the construction of the read/write device as used in a preferred embodiment.

FIG. 4 shows an embodiment of the write/read device as used in the preferred embodiment. A minicomputer (100) (Philips P 800) acts as a data source/data receiver and supplies and receives control signals to and from the device. The elements 104, 105, 110, 113 are control devices. The elements 102, 114 and 116 are memory devices; 112 is a verification unit. The element 101 is an encoder which adds a number of error correction bytes (for example, 3 bytes) to a number of bytes of data information, for example, 13 bytes, originating from the minicomputer. The control device 104 receives clock signals from the minicomputer and enable signals from the memory device 102 and processes these signals. The control device 104 applies control signals to the encoder 101, the memory device 102 and the minicomputer 100. The control device 104 controls the data stream (for example, 8 bits in parallel) between the minicomputer (100), via the encoder 101, and the memory device (102). The memory device 102 comprises two buffers $W_1$ and $W_2$. These two buffers are alternately filled with encoded data information. Either the input or the output of such a buffer is active. In the buffers each time data blocks are formed from the information received. Element 103 is an acousto-optic modulator which receives the data stream originating from the memory (102) on one input. A beam originating from a laser (118) is modulated in known manner with this data stream in the acousto-optic modulator; see, for example, the article "Wider-band acousto-optic deflectors using acoustic beam steering" by Y. Coquin, J. Griffin and L. Anderson, IEEE Transactions on Sonics and Ultrasonics, Vol. 17, No. 1, January 1970, pages 34–40. The modulated laser beam (107) (WRS beam) writes the data in a bit serial sequence in the optical disc. The element 3 is the semi-transparent mirror shown in FIG. 3b. The elements 109 and 111 are demodulators which adapt the optical signal to a suitable signal for the write-read device. Via the demodulator (109) the control device (105) receives the organization information read from the synchronization area of each sector by the WRS beam (107). The control device (105) has an output connected to the minicomputer and supplies the minicomputer with control information, for example "beginning of a sector". The control device 105 controls the data steam between the memory device 102, via the modulator 103, and the optical disc 106.

Directly after the writing, the data written is read by the DRS beam (108). After having been demodulated by the demodulator (111), the data is applied to the verification unit (112) in which the verification procedure is performed. The control device (110) receives the organization information read from the sectors of the optical disc by the DRS beam. The control device (110) controls the data stream between the optical disc (106), via the demodulator (111), and the verification unit (112). The control device (105) has an output connected to the minicomputer and applies information to the minicomputer, for example, "end of a sector". During a read procedure (when data information is retrieved from the disc in order to be transferred to the minicomputer), the control device (110) also controls the transfer to the memory device (114). The memory device (114) comprises two buffers $R_1$ and $R_2$ which are alternately filled with data information originating from the optical disc. A buffer of this kind has a storage capacity of one data block. The memory device (116) comprises two buffers $R_3$ and $R_4$, each of which has a storage capacity of one data block. An element 115 is a decoder. The control device (113) receives clock signals from the minicomputer and from the decoder (115). The control device (113) applies control signals to the memory device (114), the decoder (115) and the memory device (116). The sectors read which are stored in the memory (114) are decoded by the decoder (115) and, if they are properly decoded, they are stored in the memory (116): if not, they are deactivated. In the memory (116) the correctly written data blocks are selected and applied to the minicomputer. The incorrectly written data blocks are deactivated.

Hereinafter, reference will often be made to the elements of FIG. 4; the number of the element will be stated each time between brackets.

FIG. 5a shows an embodiment for the writing of data blocks in a number of successive sectors of a track of the optical disc. The encoded data blocks, being stored in the memory device (102), are written in the optical disc in quad-phase modulated manner. Quad-phase modulation is described in the article by U. Appel and K. Tröndle "Zusammenstellung und Gruppierung verschiedener Kodes für die Uebertragung digitaler Signale", published in Nachrichtentechnische Zeitschrift, Heft 1, 1970, pages 11–16. Assume that the WRS and the DRS beam are in the sector n−1. The data block stored in the buffer $W_2$ of the memory (102) is written in the data field of the sector n−1 (DTV(n−1) ) (W2→DSC) (DSC=disc). (What is written in the sector is stated at the line IN in the Figure). At the same time, the other buffer $W_1$ is loaded with data information (DAT (i)) from the minicomputer (100). The vector address is added to the data information loaded into W1. The sector address of the sector (n−1), denoted as SA(n−1), is added as the vector address VA (n−1) to the data information DAT(i). This sector address SA(n−1) is known from the Organization information read by the beam from the synchronization area (HD (n−1) ) of sector (n−1). While the data block is being written from the buffer $W_2$ into the data field of the sector (n−1) by the WRS beam, the DRS beam reads the data directly after the writing. The data read by the DRS beam is compared in the verification unit (112) with the data of the data block stored in the buffer W2. Inocrrectly written data which can be corrected by the added error correction is considered to be correctly written. When the DRS beam is at the beginning of the sector n, a result, referred to as the verification result, appears on an output of the verification unit (112). This verification result indicates whether the data block has been correctly or incorrectly written. At the same time the beam is present in the synchronization area of the sector n (HD (n)) where it reads the organization information. The verification result is applied to the minicomputer and the memory device (102) (VRF). Assume that the verification result is positive, i.e. the data block has been correctly written in the sector n−1. Like for the sector n−1, the content of the buffer W1 (Dat(i)+ VA(n−1) is written in the sector n of the optical disc and the buffer W2 is released, so that the next data block (Dat (i+1)+VA(n)) can be loaded. Assume that the verification result for the writing in the sector n is negative, i.e. the inscribing in DTV(n) was incorrect. The data block Dat (i)+VA (n−1), therefore, has to be rewritten in sector n+1. This data block (Dat (i)+VA (n−1)) is still present in the buffer W1 which is not released in this case. The vector address Va (n−1), inserted in the data block stored in the buffer W1, indicates the sector (n−1) as the last correctly written sector. The data block from buffer W1 is thus rewritten in the sector (n+1) without modification. In buffer W2, however, the next data block with the inserted vector address VA(n) which indicates the sector n is already present. Because the sector n is not a correctly inscribed sector, it may not be indicated by a vector address. The vector address of the data block stored in the buffer W2, therefore, has to be adapted; for this choice of the vector address it becomes VA(n+1). Because the buffer W1 is not released, no new data block is fetched from the minicomputer (100).

The statement "a vector address indicates a preceding, correctly inscribed sector" is illustrated in FIG. 5b. The content of the sectors is the same as that of FIG. 5a. The verification result for the sector n+1 is positive. The write process is then analogous to that described for the sector n−1. The content of the buffer W2 (Dat-(i+1)+VA(n+1)) is written in the sector n+2 of the optical disc (W2>DSC), and in the buffer W1 the next data block Dat(i+2)+VA(n+2) is loaded. When the organization information in HD of a sector is missing or cannot be adequately read, the sector is invalidated by writing in only a part of the data field. The write procedure then continues as usual for the next sector. Writing in a consecutive series of sectors is thus maintained. The vector address of the data block which is written in a first one of a series of sectors of the optical disc to be inscribed is replaced by a sign (BG 1 begin) to indicate that it is the first data block. This is necessary for the selection of the vector address, because there is no preceding sector.

Figure 6:
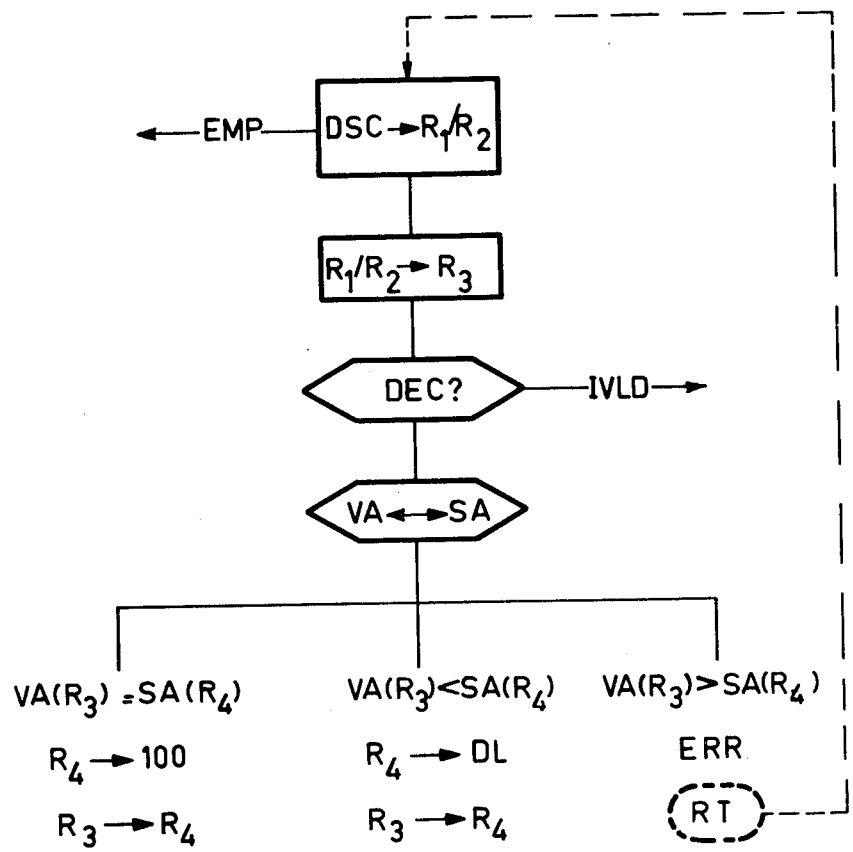

FIG. 6 shows a flow chart of a procedure for reading the information from a sector inscribed by means of the described procedure.

The sectors are consecutively read. Information read from a sector by the read beam is stored, after demodulation (111), alternately in one of the two buffers R1 or R2 of the memory (114). (DSC→R1/R2). If the sector read was empty, information EMP (=empty) is applied to the minicomputer 100; this information indicates a last one of a series of inscribed sectors.

Subsequently, the data block is decoded (115). During decoding it is checked whether incorrectly written data can be corrected by the inserted error correction bits. The result of the decoding (DEC?) is output on an output (118) of the decoder. The decoded data block is subsequently transferred to the buffer R3 of the memory 116 (R1/R2→R3).

If the decoding result is positive, the vector address of the data block now present in the buffer R3 is checked (VA⇌SA). If the decoding result was negative, the data block present in the buffer R3 is deactivated (IVLD=invalid). Subsequent to the procedure described with reference to FIG. 2, the test concerning the vector address is performed by comparing this address with a reference value. Further to the write procedure this reference value is the sector address. The data block from a previously read sector is stored in the buffer R4 of the memory (116). Analogous to the description of FIG. 2, there are again three possibilities.

1. VA(R3)=SA(R4)

The vector address of the data block in R3 equals the sector address of the data block in R4. In this case the data block of R4 is a correctly written data block. The data block of R4 is applied to the minicomputer (100) (R4→100) and the data block from R3 is stored in R4 (R3→R4). It is to be noted that the transfer (R3→R4) is a fictitious transfer which implies only a reversal of the indication. The information remains in R3, but R3 is now referred to as R4 and vice versa.

2. VA(R3)<SA(R4)

The value of the vector address of the data block in R3 is smaller than the value of the sector address of the data block in R4. In this case a rewritten sector is present in R3. The content of R4 is deactivated (R4>DL) and the content of R3 is transferred to R4 (R3>R4).

3. VA(R3)>SA(R4)

The value of the vector address of the data block in R3 is larger than the value of the sector address of the data block in R4. In this case an error indication is given (ERR=error). The system has a facility for reading the sector at least once more in this case (RT−RETRY).

FIG. 7 illustrates a read procedure on the basis of a chosen example where the sectors 0, 2, 3, 4, 7, 8, 9, 10 are correctly inscribed sectors, sectors 1 and 6 are incorrectly inscribed, and in sector 5 the vector address was correctly written but the data were incorrectly written. The sectors have been inscribed in accordance with the described write procedure, starting with sector 0 with the sector address SA(0) which is the first sector of a track of the optical disc. The written information is stated at the top in the row IN. The read beam is present in the data field (DTV) of the sector 0 and the information read is demodulated and stored in the buffer R1 (DSC→R1). When the sector 1 is read, the information from the sector 1 is stored in a buffer R2. The information present in the buffer R1 is decoded (115) and stored in a buffer R3 (R1→R3). When the sector 2 is read, the result of the decoding (DEC?) of the data block, stored in the buffer R3, is fetched from an output (118) of the decoder by the minicomputer. The information from the sector 2 is stored in the buffer R1 (DSC→R1). The information from R3, being Dat(0)+BG, is correctly decoded, so the result of DEC? is valid (VLD=valid) and the value of the vector address can be examined. The value of the vector address of the data block present in the buffer R3 is compared with the value of the sector address of a data block present in a buffer R4 (VA<>SA). Because the beginning of the procedure is concerned, the buffer R4 is empty. In this case the information is transferred from the buffer R3 to the buffer R4 (R3>R4). Subsequently, the content of the buffer R2 is transferred to the butter R3. Because the transfers DSC>R1/R2 and R1/R2>R3 take place in the same manner for all sectors, these operations will no longer be explicitly mentioned hereinafter; only the result of DEC?, Va< >SA with the relevant operations will be discussed. When the sector 3 is read, the result of DEC? is negative (IVLD), because the writing was incorrect in the sector 1. The information from the buffer R3 is invalid and is, therefore, deactivated. When the sector 4 is read, the result of DEC? is positive (VLD), the data is correctly decoded and the test VA(R3)< >SA(R4) can be executed. The vector address of the data block from sector 2 indicates sector 0: VA(0). Sector 0 (SA(0)) was the last correctly inscribed data block and the content is present in the buffer R4. Therefore, VA(+)=SA(0), or the vector address of the data block from R4 has the same value as the sector address of the data block from R4. Because a vector address indicates only a correct data sector, it may be concluded therefrom that a correct data block is present in the buffer R4. The content of the buffer R4 can, therefore, be transferred to the minicomputer (100) (R4>100). The information transferred to the minicomputer is stated on the line OUT 100. The buffer R4 then stores the information from the buffer R3. Analogously, the transfer (R4>100) takes place when the sectors 5 and 6 are read. Thus, when the sector 5 is read, the data information from the sector 2 is transferred to the minicomputer. In sector 5 a correct vector address VA(4) is present and a data information in which an error is present (Dat (f)=data incorrect). The data block is correctly decoded. The result of DEC? in sector 7 was valid (VLD). Because the value of the vector address VA(4) corresponds to SA(4), (VA(4)=SA(4)), because buffer R4 contains sector 4, the data block from sector 4 (Dat(3)) is considered to be a correct data block and is transferred to the minicomputer, while the content of the sector 5 (Dat (f)) is applied to the buffer R4. In sector 6 the inscribing was incorrect and, consequently, the result of DEC? is negative when the sector 8 is read. Sector 7 was correctly inscribed, so the result of DEC? is positive. However, R4 then contains the incorrect data from the sector 5 (Dat (f)), the value of the sector address being SA(5). The vector address of the data block from sector 7 indicates the last correct sector, i.e. the sector 4, so VA(4), VA(4)<SA(5). It is deduced therefrom that an incorrect data block was present in R4 and that a rewritten data block is present in R3. The content of R4 is, therefore, deactivated (DL) and replaced by the content of R3. During the reading of the sector 10, the procedure is correct and the data of the buffer R4 (Dat(4)) is transferred to the minicomputer. The last one of the series of correctly inscribed data sectors is transferred to the minicomputer when an empty sector is encountered, because such a last sector cannot be indicated by a vector address, when the described method of choosing such vector addresses is used.

What is claimed is:

1. A device for writing and reading information in a bit-serial sequence into consecutively arranged sectors of a record carrier body, said device comprising:

a first memory (21, 102) for the temporary storage of a data block, said data block each time comprising a different part of the information to be written, an input of said first memory being connected to receive said information from an external source;

write means (28) for writing said data block into a sector of said record carrier body, said write means having an input connected to an output of said first memory;

read means (29) for reading directly after said writing the data block into said sector;

a verification unit (30, 112) having a first input connected to said first memory for receiving said data block and a second input connected to said read means for receiving the data block read out of said sector, said verification unit being provided for comparing the data block read out of said sector to said data block and for generating a positive result signal if the data block read out of said sector corresponds to said data block;

an identifier generator, having an input connected to said verification unit for receiving said positive result signal, said identifier generator being provided for generating under control of said positive result signal an identifier indicating the address of a sector which has been correctly inscribed before the generation of said positive result signal, for each positive result signal there being generated a different identifier, said identifier generator having an output connected to said first memory and said identifier generator being also provided for inserting a generated identifier into a data block to be written into a next sector.

2. A device as claimed in 1, wherein said first memory comprises at least two memory units (W1, W2), each memory unit having a capacity for the storage of at least one data block, said device being provided with activating means for activating at substantially the same instant either an input of one memory unit and an output of the other memory unit, or an output of said one memory unit and an input of said other memory unit.

3. A device as claimed in claim 1 or 2, comprising a second memory for the temporary storage of a data block read from a sector, an input of said second memory being connected to a read device and an output of the second memory being connected to a third memory (116), said third memory comprising at least two memory units (R3 and R4), each memory unit having a capacity for the storage of at least one data block, said third memory comprising an output which is connected to a data receiver, means being provided which are controlled by the identifier either to supply the information stored in the memory unit to the data receiver or to deactivate this information.

4. A device as claimed in claim 1 or 2, wherein said record carrier body (106) is made of a radiation-sensitive medium.

5. A method of writing information in a bit-serial sequence into consecutively arranged sectors of a record carrier body, said method comprising the steps of:

(a) storing into a memory, information to be written into a sector;

(b) adding a first identifier adjacent to said stored information, said first identifier and said stored information forming together a first data block;

(c) writing said first data block into a first sector;

(d) reading the data block written into said first sector directly after said writing;

(e) verifying if the data block read out of said first sector corresponds with said first data block stored into said memory;

(f) in case that the data block read out of said first sector does not correspond with said first data block, rewriting said first data block into a subsequent sector and repeating for said first data block written into said subsequent sector said method starting from step (d);

(g) in case that the data block read out of said first sector corresponds with said first data block, forming on the basis of the verification a second identifier which indicates the address of a previously correctly inscribed sector, said first and said second identifier being mutually exclusive;

(h) repeating the steps of said method for a second data block to be written in a second sector, said second data block comprises said second identifier and further information, said repeating step being repeated until all information to be written has been written into record carrier body.

6. A method as claimed in claim 5, wherein said second identifier indicates the address of the sector wherein said first data block has been correctly written.

7. A method of reading sectors inscribed by means of the method claimed in claim 5 or 6, wherein for the data blocks read out the sectors which are indicated at least once by an identifier are transferred to a receiver, while the data blocks read from the other sectors are deactivated.

* * * * *